(12) United States Patent
Sip

(10) Patent No.: US 8,966,136 B2
(45) Date of Patent: Feb. 24, 2015

(54) EXPANSION MODULE AND CLOUD DEVICE THEREOF

(71) Applicant: Acer Incorporated, New Taipei (TW)

(72) Inventor: Kim Yeung Sip, New Taipei (TW)

(73) Assignee: Acer Incorporated, New Taipei (TW)

( * ) Notice: Subject to any disclaimer, the term of this patent is extended or adjusted under 35 U.S.C. 154(b) by 68 days.

(21) Appl. No.: 13/712,973

(22) Filed: Dec. 13, 2012

(65) Prior Publication Data

US 2014/0047138 A1   Feb. 13, 2014

(30) Foreign Application Priority Data

Aug. 8, 2012  (TW) .............................. 101128633 A

(51) Int. Cl.
| | |
|---|---|
| *G06F 3/00* | (2006.01) |
| *G06F 13/00* | (2006.01) |
| *G06F 13/36* | (2006.01) |
| *G06F 13/38* | (2006.01) |
| *G06F 13/42* | (2006.01) |
| *G06F 1/16* | (2006.01) |

(52) U.S. Cl.
CPC .............. *G06F 13/36* (2013.01); *G06F 13/385* (2013.01); *G06F 13/4247* (2013.01); *G06F 1/1632* (2013.01)
USPC .............................. 710/36; 710/300; 710/303

(58) Field of Classification Search
None
See application file for complete search history.

(56) References Cited

U.S. PATENT DOCUMENTS

| | | | |
|---|---|---|---|
| 2010/0057969 A1 | 3/2010 | Meiri et al. | |
| 2010/0077109 A1 | 3/2010 | Yan et al. | |
| 2011/0167176 A1 | 7/2011 | Yew et al. | |
| 2014/0047145 A1* | 2/2014 | Sip ............................... | 710/105 |

FOREIGN PATENT DOCUMENTS

| | | |
|---|---|---|
| CN | 101685323 | 3/2010 |
| EP | 0902373 | 3/1999 |
| EP | 2407880 | 1/2012 |
| TW | 526423 | 4/2003 |

* cited by examiner

*Primary Examiner* — Idriss N Alrobaye
*Assistant Examiner* — Richard B Franklin
(74) *Attorney, Agent, or Firm* — Jianq Chyun IP Office

(57) ABSTRACT

An expansion module is configured to provide expansion functions to a mobile electronic device. The expansion module includes a cloud device and at least one first expansion device. The cloud device includes a first expansion bus interface and a network interface. The first expansion device is coupled to the cloud device in a daisy-chain manner, wherein each of the first expansion device includes at least one first peripheral device. The cloud device is coupled to the mobile electronic device through the first expansion bus interface or the network interface, and provides the first peripheral device to the mobile electronic device for use.

10 Claims, 3 Drawing Sheets

EXPANSION MODULE AND CLOUD DEVICE THEREOF

CROSS-REFERENCE TO RELATED APPLICATION

This application claims the priority benefit of Taiwan application serial no. 101128633, filed on Aug. 8, 2012. The entirety of the above-mentioned patent application is hereby incorporated by reference herein and made a part of this specification.

BACKGROUND

1. Field of the Invention

The invention relates to an expansion module and a cloud device, and more particularly, to an expansion module capable of coupling to a mobile electronic device via an expansion bus interface or a network interface, and a cloud device thereof.

2. Description of Related Art

Following the advances in technology, computer functionalities tend to diversify, and varieties of peripheral equipments have also emerged continuously. In order to facilitate a user to enhance the computer performance or expand the computer functionalities, expansion bus slots such as an accelerated graphics port (AGP), a peripheral component interconnect (PCI), a PCI Express (PCI-E), and so forth are generally configured on a motherboard of the computer in order to enable the user to insert a graphic card, a sound card, a network card, and other expansion cards. In addition, expansion bus interfaces such as a Firewire and a Universal Serial Bus (USB) are also configured on the computer host, so that the user is able to connect the computer with peripheral devices such as a hard drive, a printer and so forth.

In terms of a mobile electronic device such as a notebook computer or a Tablet, in order to enable the host body to develop and design toward a direction of becoming light and thin to increase the convenience and the mobility in using the mobile electronic device, an external expansion device has been developed among the conventional technology, such as a docking station of a notebook computer. The expansion device may include a peripheral device and an expansion card therein, so as to provide functionalities of the peripheral device and the expansion card to the mobile electronic device for use.

Nevertheless, since when the mobile electronic device is to use expansion functions provided by the peripheral device, the mobile electronic device must control the peripheral device through a connection between the expansion bus interface and the expansion device. If the user is to use the function of the peripheral device at different locations, the user must also carry the mobile electronic device and the expansion device at the same time. As a result, in order to increase expandability of the mobile electronic device, advantages of the mobile electronic device in convenience and mobility are no longer existed.

SUMMARY OF THE INVENTION

The invention provides an expansion module capable of enabling a mobile electronic device to make use of expansion functions provided by a peripheral device of an expansion device at any location.

The invention provides a cloud device capable of coupling to a mobile electronic device through a network interface or an expansion bus interface, and accordingly providing expansion functions of a peripheral device to the mobile electronic device for use.

The invention provides an expansion module configured to provide expansion functions to a mobile electronic device. The expansion module includes a cloud device and at least one first expansion device. The cloud device includes a first expansion bus interface and a network interface. The first expansion device is coupled to the cloud device in a daisy-chain manner, wherein each of the first expansion device includes at least one first peripheral device, the cloud device is coupled to the mobile electronic device through the first expansion bus interface or the network interface, and provides the first peripheral device to the mobile electronic device for use.

In an embodiment of the invention, the expansion module further includes a second expansion device. The second expansion device includes as least a second peripheral device, a fourth expansion bus interface and a fifth expansion bus interface. The fourth expansion bus interface is coupled to the first expansion bus interface. The fifth expansion bus interface is coupled between the second peripheral device, the fourth expansion bus interface and the mobile electronic device. Wherein, the first expansion bus interface and the fourth expansion bus interface support the same expansion bus standard. A transmission rate of the fifth expansion bus interface is higher than that of the first expansion bus interface and the fourth expansion bus interface. The fifth expansion bus interface provides the second peripheral device to the mobile electronic device for use, and by interexchanging signals passed between the expansion bus standards supported by the fourth expansion bus interface and the fifth expansion bus interface, provides the first peripheral device to the mobile electronic device for use.

The invention provides a cloud device configured to provide expansion functions to a mobile electronic device. The cloud device includes a network interface, a first expansion bus interface and a processor. The processor is coupled to the network interface and the first expansion bus interface. When the cloud device couples to the mobile electronic device through the network interface, the processor provides at least one peripheral device to the mobile electronic device for use through the network interface. When the cloud device couples to the mobile electronic device through the first expansion bus interface, the processor provides the peripheral device to the mobile electronic device through the first expansion bus interface for use.

According to the foregoing, the expansion module in the invention is coupled to the mobile electronic device via the first expansion bus interface of the cloud device or the network interface, and thus a user may connect the peripheral device and control the expansion functions thereof through the first expansion bus interface or the network interface according to the needs. As a result, the user may utilize the expansion functions provided by the expansion module at any location via different means, and thereby enhancing expandability and convenience of the mobile electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DETAILED DESCRIPTION OF DISCLOSED EMBODIMENTS

Figure 1:
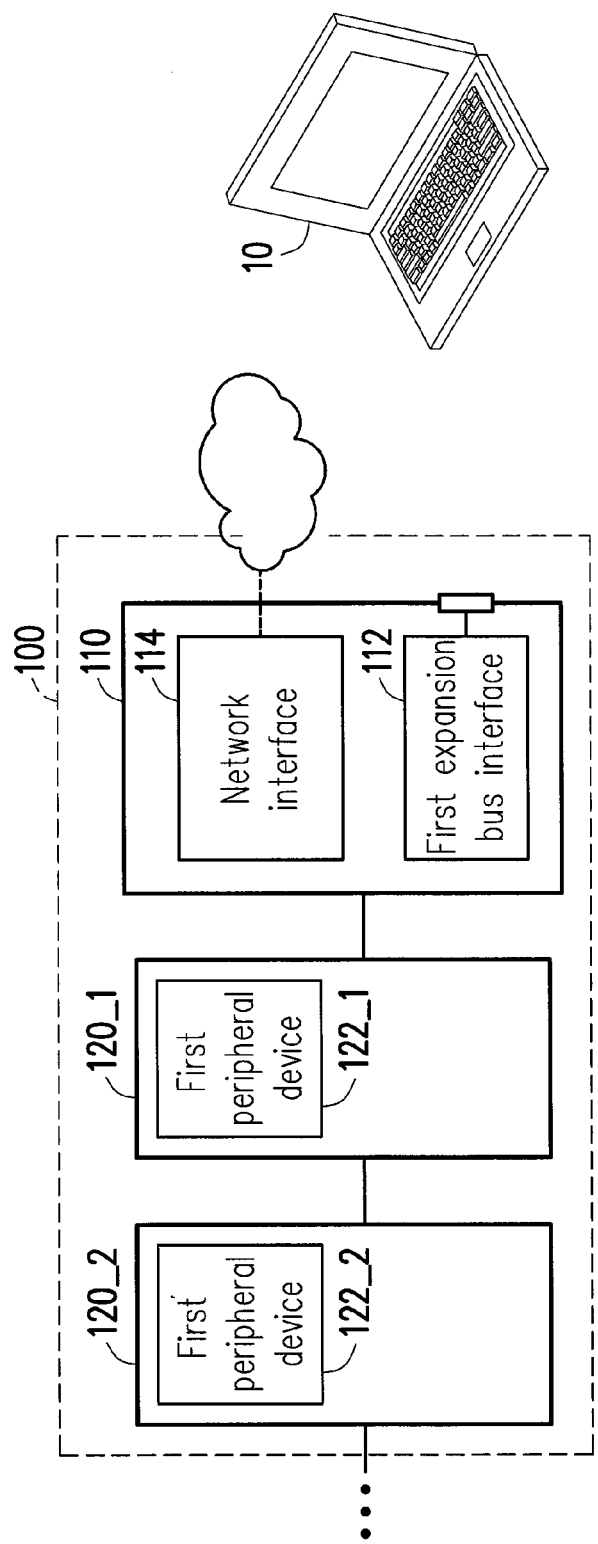
FIG. 1 is a schematic diagram illustrating an expansion module according to an embodiment of the invention.

An expansion module of a mobile electronic device is provided in an embodiment of the invention. The expansion module may utilize different transmission means to provide a peripheral device to the mobile electronic device for use, thus enabling the mobile electronic device to utilize expansion functions provided by the expansion module at any location without being limited by a connection limitation in physical wiring. In order to make the disclosure and the content of the invention comprehensible, several exemplary embodiments are described in detail below as examples that can be implemented. Additionally, wherever it is possible, elements/components/steps with the same reference numerals in the drawings and the embodiments represent the same or similar parts.

FIG. 1 is a schematic diagram illustrating an expansion module according to an embodiment of the invention. In the present embodiment, an expansion module 100 provides the mobile electronic device 10 with expansion functions. Wherein, the mobile electronic device 10 may be a mobile electronic device such as a notebook computer, an ultrabook computer, a tablet computer, a personal digital assistant (PDA) or a smart phone, and the expansion module 100 may be designed as a docking station or other types, the invention is not limited thereto.

Referring to FIG. 1, the expansion module 100 includes a cloud device 110 and at least one first expansion device; herein first expansion devices 120_1 and 120_2 are taken as examples. The cloud device 110 includes a first expansion bus interface 112 and a network interface 114. The first expansion devices 120_1 and 120_2 are coupled to the cloud device 110 in a daisy-chain manner, and the first expansion devices 120_1 and 120_2 respectively include at least one first peripheral device; herein first peripheral devices 122_1 and 122_2 are taken as examples. Wherein, the cloud device 110 is coupled to the mobile electronic device 10 through the first expansion bus interface 112 or the network interface 114, so as to provide the first peripheral devices 122_1 and 122_2 to the mobile electronic device 10 for use.

In the present embodiment, each of the first peripheral devices 122_1 and 122_2 is, for example, a peripheral device such as a hard disk drive (HDD), an optical disk drive (ODD) or a card reader. In addition, although in the present embodiment, it is taken as the example that each of the first expansion devices 120_1 and 120_2 respectively includes one peripheral device, in other embodiments, each first expansion device may include a plurality of peripheral devices to be provided to the mobile electronic device for use; the invention is not limited thereto.

Specifically, the first expansion bus interface 112 is a transmission interface, which utilizes a direct transmission by physical wiring, such as a USB hub or a thunderbolt controller. When the mobile electronic device 10 is coupled to the expansion module 100 through the first expansion bus interface 112, the mobile electronic device 10 performs a signal communication transmission in-between with the expansion module 100 according to an expansion bus standard supported by the first expansion bus interface 112, so as to control and utilize the expansion functions of the first peripheral devices 122_1 and 122_2.

The network interface 114 is, for example, an Ethernet interface, or a wireless network interface of a wireless communication protocol that supports 3G, WiFi, Long Term Evolution (LTE), Bluetooth, and so forth. When the mobile electronic device 10 is coupled to the expansion module 100 through the network interface 114, the expansion module 100 may connect to Internet via wired or wireless manner through the network interface 114 of the cloud device 110. Therefore, the mobile electronic device 10 may transmit signals to the expansion module 100 through Internet or wireless local area network (WLAN), so as to control and utilize the expansion functions of the first peripheral device s122_1 and 122_2.

In other word, the expansion module 100 has provided a different transmission means in-between with the mobile electronic device 10 via the cloud device 110. The user does not need to carry both the expansion module 100 and the mobile electronic device 10 at the same time, and may also enable the mobile electronic device 10 to control the first peripheral devices 122_1 and 122_2 through a variety of connection means such as Internet or local wireless network, which is not required to connect to the expansion module 100 via physical wiring. The user, even is far way from home, may also enable the mobile electronic device 10 to couple to the expansion module 100 at home through the Internet and the cloud device 110.

For example, when the user is at a closer distance from the expansion module 100, the user may utilize the first expansion bus interface 112 to connect the mobile electronic device 10 with the expansion module 100, When the user is at farer distance from the expansion module 10 and is difficult to directly connect the mobile electronic device 10 with the expansion module 100 through the first expansion bus interface 112, the user may perform a transmission to the expansion module 100 according to the needs via the wireless network or the Internet, and then the mobile electronic device 10 may transmit or receive the signals through the network interface 114 of the expansion module 10, so as to control the first peripheral devices 122_1 and 122_2. As a result, the user, no matter at any location, may provide the first peripheral devices 122_1 and 122_2 to the mobile electronic device 10 for use through the cloud device 110; and therefore, the functionalities of the expansion module 100 are no longer limited to a connection of physical transmission interface.

Figure 2:
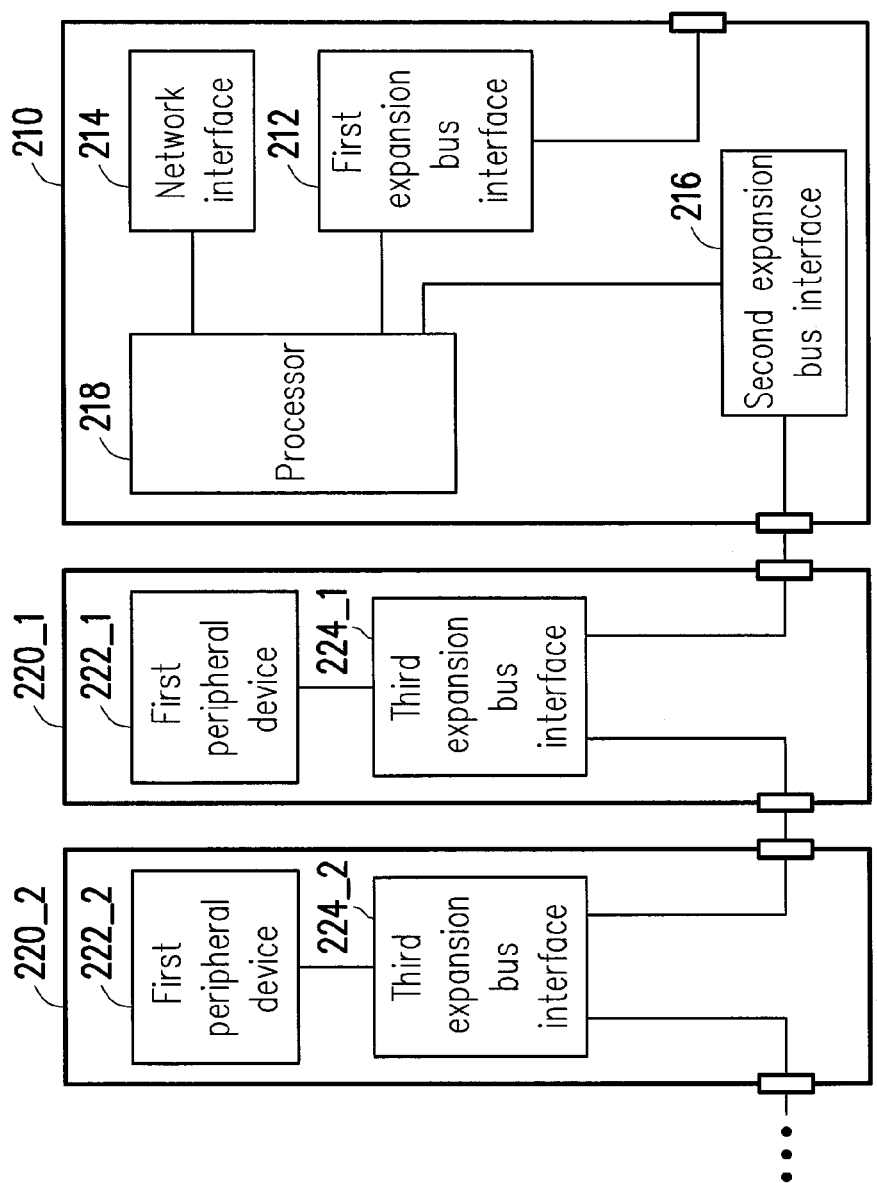
FIG. 2 is a schematic diagram illustrating an expansion module according to another embodiment of the invention.

For further describing the embodiment of the invention, FIG. 2 is a schematic diagram illustrating an expansion module according to another embodiment of the invention. Referring to FIG. 2, the expansion module 200 includes a cloud device 210 and at least one first expansion device, herein first expansion devices 220_1 and 220_2 are taken as examples. The cloud device 210 includes a first expansion bus interface 212, a network interface 214, a second expansion bus interface 216, and a processor 218, wherein the processor 218 is coupled to the first expansion bus interface 212, the network interface 214 and the second expansion bus interface 216.

The first expansion device 220_1 includes a first peripheral device 222_1 and a third expansion bus interface 224_1, and the first expansion device 220_2 includes a first peripheral device 222_2 and a third expansion bus interface 224_2, wherein the third expansion bus interface 224_1 and the 224_2 are coupled to the second expansion bus interface 216 of the cloud device 210 in the daisy-chain manner, and the third expansion bus interface 224_1 and the 224_2 are respectively coupled to the corresponding first peripheral devices 222_1 and 222_2.

In the present embodiment, the first expansion bus interface 212, the second expansion bus interface 216 and the third expansion bus interfaces 224_1 and 224_2 support the same expansion bus standard, and for example, these interfaces may all be USB hubs. Therefore, signals between the cloud device 210 and the first expansion devices 220_1 and 220_2 may transfer with each other directly without requiring a conversion. However, in other embodiments, the first expansion bus interface 212, the second expansion bus interface 216 and the third expansion bus interfaces 224_1 and 224_2 may also support different expansion bus standards according to needs of the designer; the invention is not limited thereto.

When the cloud device 210 is coupled to the mobile electronic device 10 and provides the first peripheral devices 222_1 and 222_2 to the mobile electronic device 10 for use, no matter the cloud device 210 is coupled to the mobile electronic device 10 through the network interface 214 or the first expansion bus interface 212, the processor 218 is controlling the first peripheral devices 222_1 and 222_2 through the second expansion bus interface 216 and the third expansion bus interfaces 224_1 and 224_2 with an identity of host device, so as to provide the first peripheral devices 222_1 and 222_2 to the mobile electronic device 10 for use.

When the cloud device 210 is coupled to the mobile electronic device 10 through the first expansion bus interface 212, since the cloud device 210 and the mobile electronic device 10 are both the host device, a control conflict would be generated inevitably if a signal transmission is directly performed between the two. Therefore, in the cloud device 210, the first expansion bus interface 212 is further configured to be a client/host bridge interface for providing the cloud device 210 an identity of client device, so as to enable the processor 218 to communicate with the mobile electronic device 10 with an identity of client device, and thus it is able to smoothly provide the first peripheral devices 222_1 and 222_2 to the mobile electronic device for use through the first expansion bus interface 212.

Figure 3:
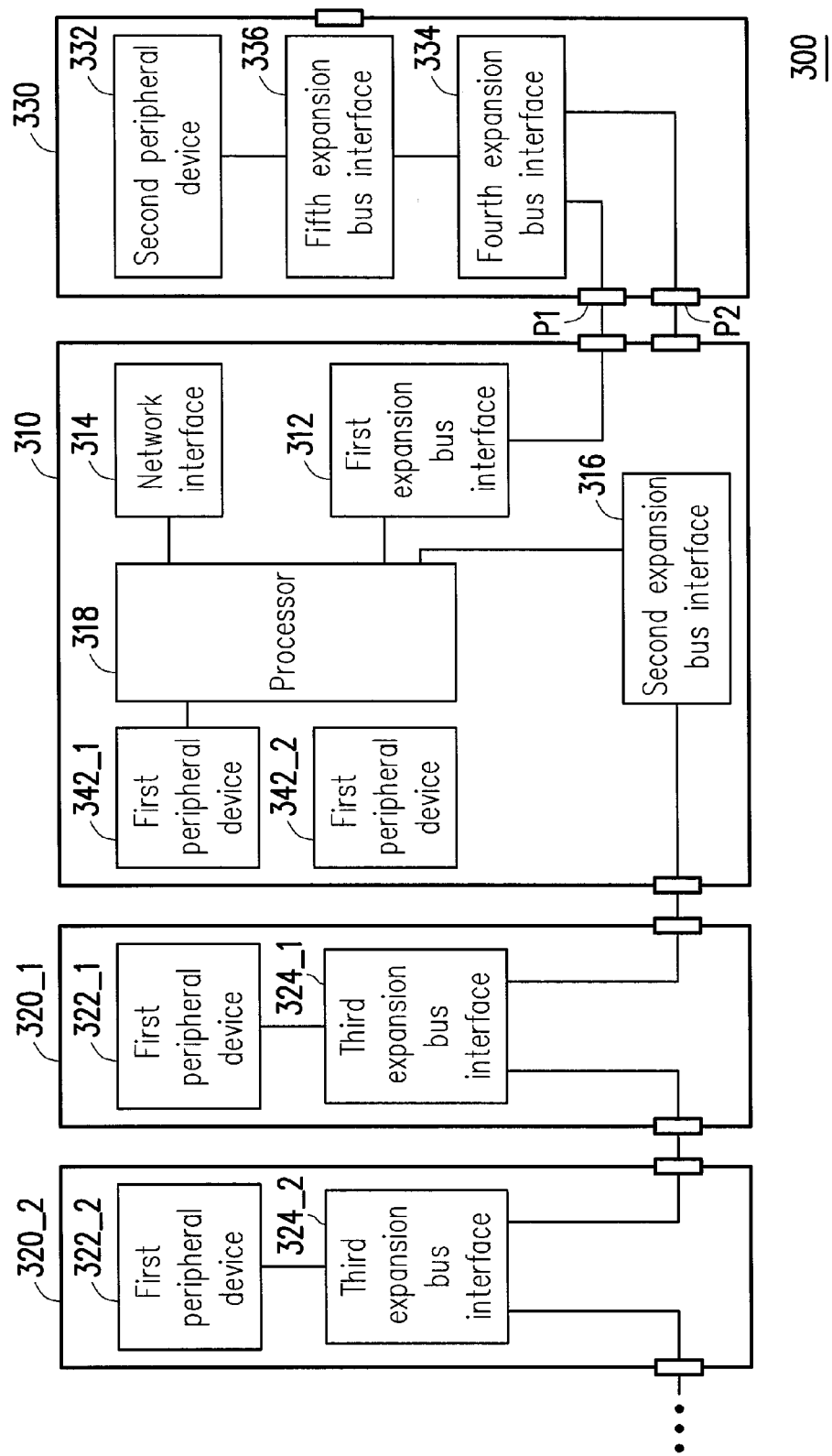
FIG. 3 is a schematic diagram illustrating an expansion module according to still another embodiment of the invention.

FIG. 3 is a schematic diagram illustrating an expansion module according to still another embodiment of the invention. Herein, the cloud device 310 and the first expansion devices 320_1 and 320_2 are generally the same as the cloud device 210 and the first expansion devices 220_1 and 220_2 of the previous embodiment, and thus the details are not repeated herein.

Referring to FIG. 3, in the present embodiment, the expansion module 310 further includes a second expansion device 330. The second expansion device 330 may be coupled between the mobile electronic device 10 and the cloud device 310. The second expansion device 330 includes at least one second peripheral device, a fourth expansion bus interface 334 and a fifth expansion bus interface 336, herein the at least one second peripheral device is, for example, the second peripheral device 332.

The fourth expansion bus interface 334 is coupled to the first expansion bus interface 312. The fifth expansion bus interface 336 is coupled between the second peripheral device 332, the fourth expansion bus interface 334 and the mobile electronic device 10. Wherein, the first expansion bus interface 312 and the fourth expansion bus interface 334 support the same expansion bus standard, and the fifth expansion bus interface supports an expansion bus standard with a transmission rate higher than that of the first to the fourth expansion bus interfaces 312, 324_1, 324_2 and 334.

Specifically, in order to further enhance the functionalities of the expansion module, in the expansion module 300, the expansion bus interfaces with different transmission rates are respectively utilized to control the signal transmissions of different types of peripheral devices, so as to provide a peripheral device having a higher transmission requirement with a faster expansion bus interface.

Therefore, in the second expansion device 330, the fifth expansion bus interface 336 provides the second peripheral device 332 to the mobile electronic device for use, wherein the second peripheral device 332 is a peripheral device having a higher transmission requirement, such as a graphics chip or a display card.

In addition, the fifth expansion bus interface 336 further interexchanges the passed through signals between the expansion bus standards supported by the fourth expansion bus interface 334 and the fifth expansion bus interface 336, and thus the first peripheral devices 322_1 and 322_2 may be provided to the mobile electronic device for use through the cloud device 310 and the second expansion device 330. Wherein, the fifth expansion bus interface 336 is, for example, a thunderbolt controller with a transmission rate up to 20 Gbps, and the first to the fourth expansion bus interfaces 312, 316, 324_1, 324_2 and 334 are, for example, USB 3.0 interfaces with transmission rates up to 5 Gbps.

In the present embodiment, when the mobile electronic device is coupled to the expansion module 300 through connection ports of the fifth expansion bus interface 336, the mobile electronic device transmits the signals complied to the standard supported by the fifth expansion bus interface 336 to control second peripheral device 332, converts the transmitted signals through a conversion of the fifth expansion bus interface 336 into the signals complied to the standard supported by the fourth expansion bus interface 334. The converted signal is transmitted through a signal transmission path formed by the first expansion bus interface 312, the second expansion bus interface 316 and the third expansion bus interfaces 324_1 and 324_2 to control the first peripheral devices 322_1 and 322_2.

Furthermore, the expansion module 300 in addition to use the expansion functions of first peripheral devices 322_1 and 322_2 via concatenating the first expansion devices 320_1 and 320_2, the cloud device 310 per se may also include the first peripheral device to provide the expansion functions to the mobile electronic device, herein first peripheral devices 342_1 and 342_2 are taken as examples, wherein the first peripheral devices 342_1 and 342_2 are coupled to and controlled by a processor 318.

Accordingly, when the mobile electronic device is connected to the expansion module 300 through the fifth expansion bus interface 336, expansion functions of the first peripheral devices 322_1 and 322_2, the peripheral device 342_1 and 342_2 and the second peripheral device 332 may be used at the same time. In addition, when the mobile electronic device is connected to the expansion module 300 through the network interface 314, the expansion functions of the first peripheral devices 322_1 and 322_2 and the peripheral devices 342_1 and 342_2 then may be used through the cloud device 310.

Noteworthily, in the present embodiment, the mobile electronic device in addition to being able to control the first peripheral devices 342_1 and 342_2 and the first peripheral devices 322_1 and 322_2 at the terminal through the cloud device 310, when the cloud device 310 is not present, the first expansion devices 320_1 and 320_2 may also be directly connected with the fourth expansion bus interface 334 of the second expansion device 330 through the third expansion bus interfaces 324_1 and 324_2.

In other words, the first expansion devices 320_1 and 320_2 and the second expansion device 330 are mutually compatible, and may be directly connected to transmit the signals. When the cloud device 310 is present, the second expansion device 330 may connect with the first expansion bus interface 312 of the cloud device 310 through a connection port P1 of the fourth expansion bus interface 334, so as to enable the mobile electronic device to use the first peripheral devices 322_1 and 322_2 through the cloud device 310. When the cloud device 310 is not present, the second expansion device 330 may also connect with the third expansion bus interface 324_1 of the first expansion device 320_1 through a connection port P2 of the fourth expansion bus interface 334, and the mobile electronic device may still use the first peripheral devices 322_1 and 322_2 and the second peripheral device 332.

In summary, the expansion module in the invention is coupled to the mobile electronic device via the first expansion bus interface of the cloud device or the network interface, and thus the user may connect and use the expansion functions of the peripheral device through the first expansion bus interface or the network interface according to the needs. As a result, the user may utilize the expansion functions provided by the expansion module via different transmission means at any location, and thus expandability and convenience of the mobile electronic device is further enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An expansion module configured to provide expansion functions to a mobile electronic device, comprising:
   a cloud device comprising a first expansion bus interface and a network interface; and
   at least one first expansion device coupled to the cloud device in a daisy-chain manner, wherein each of the first expansion device comprises at least one first peripheral device, and the cloud device is coupled to the mobile electronic device through the first expansion bus interface or through the network interface, and provides the first peripheral device to the mobile electronic device for use, wherein the cloud device provides the first peripheral device to the mobile electronic device for use through the first expansion bus interface with an identity of client device.

2. The expansion module as recited in claim 1, wherein the cloud device further comprises a second expansion bus interface, each of the first expansion device comprises a third expansion bus interface, the second expansion bus interface is coupled to the third expansion bus interface in the daisy-chain manner, and each of the third expansion bus interface is coupled to the first peripheral device of each corresponding first expansion device; when the cloud device provides the first peripheral device to the mobile electronic device for use, the cloud device controls the first peripheral device through the second expansion bus interface and the third expansion bus interface with an identity of host device.

3. The expansion module as recited in claim 2, wherein the first expansion bus interface, the second expansion bus interface and the third expansion bus interface support the same expansion bus standard.

4. The expansion module as recited in claim 3, wherein the cloud device further comprises a processor, and the processor is coupled to the network interface, the first expansion bus interface and the second expansion bus interface; when the cloud device is coupled to the mobile electronic device through the network interface, the processor provides the first peripheral device to the mobile electronic device for use through the network interface; when the cloud device is coupled to the mobile electronic device through the first expansion bus interface, the processor provides the first peripheral device to the mobile electronic device for use through the first expansion bus interface with the identity of client device; the first expansion bus interface provides the identity of the client device.

5. The expansion module as recited in claim 1 further comprising a second expansion device, the second expansion device comprising:
   at least one second peripheral device;
   a fourth expansion bus interface coupled to the first expansion bus interface; and
   a fifth expansion bus interface coupled between the second peripheral device, the fourth expansion bus interface and the mobile electronic device, wherein the first expansion bus interface and the fourth expansion bus interface support the same expansion bus standard, and a transmission rate of the fifth expansion bus interface is higher than that of the first expansion bus interface and the fourth expansion bus interface; the fifth expansion bus interface provides the second peripheral device to the mobile electronic device for use, and interchanges passed signals between the expansion bus standards supported by the fourth expansion bus interface and the fifth expansion bus interface to provide the first peripheral device to the mobile electronic device for use.

6. A cloud device providing expansion functions to a mobile electronic device, comprising:
   a network interface;
   a first expansion bus interface; and
   a processor coupled to the network interface and the first expansion bus interface; when the cloud device is coupled to the mobile electronic device through the network interface, the processor provides at least one peripheral device to the mobile electronic device for use through the network interface; when the cloud device is coupled to the mobile electronic device through the first expansion bus interface, the processor provides the peripheral device to the mobile electronic device for use through the first expansion bus interface, wherein the processor provides the peripheral device to the mobile electronic device for use through the first expansion bus interface with an identity of client device.

7. The cloud device as recited in claim 6, wherein the cloud device further comprises a first peripheral device, and the first peripheral device is coupled to the processor.

8. The cloud device as recited in claim 6, wherein the cloud device further comprises a second expansion bus interface, the second expansion bus interface is coupled to the processor and at least one expansion device, and the expansion device comprises a portion of or the entire peripheral device.

9. The cloud device as recited in claim 8, wherein each of the expansion device comprises a third expansion bus interface, the second expansion bus interface is coupled to the third expansion bus interface in a daisy-chain manner, and each of the third expansion bus interface is coupled to the peripheral device of the corresponding expansion device; when the processor provides the peripheral device to the mobile electronic device for use, the processor controls the peripheral device of the expansion device through the second expansion bus interface and the third expansion bus interface with an identity of host device.

10. The cloud device as recited in claim 9, wherein the first expansion bus interface, the second expansion bus interface and the third expansion bus interface support the same expansion bus standard, and the first expansion bus interface provides the identity of the client device.

\* \* \* \* \*